Feb. 1, 1949.  T. L. FAWICK  2,460,628
FLEXIBLE COUPLING
Filed Feb. 15, 1943  2 Sheets-Sheet 1
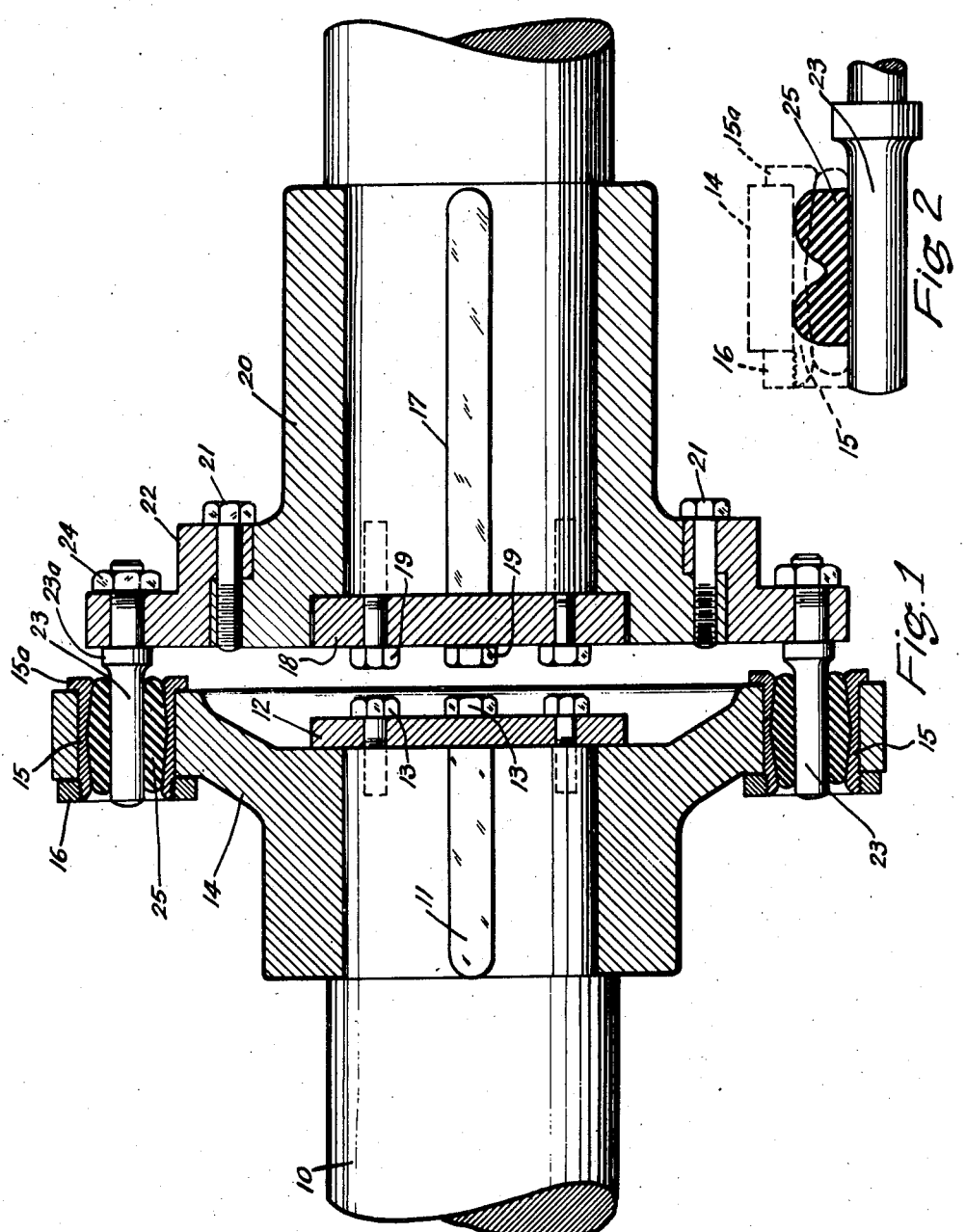
INVENTOR.
Thomas L. Fawick
BY
Willard D. Eakin
ATTORNEY

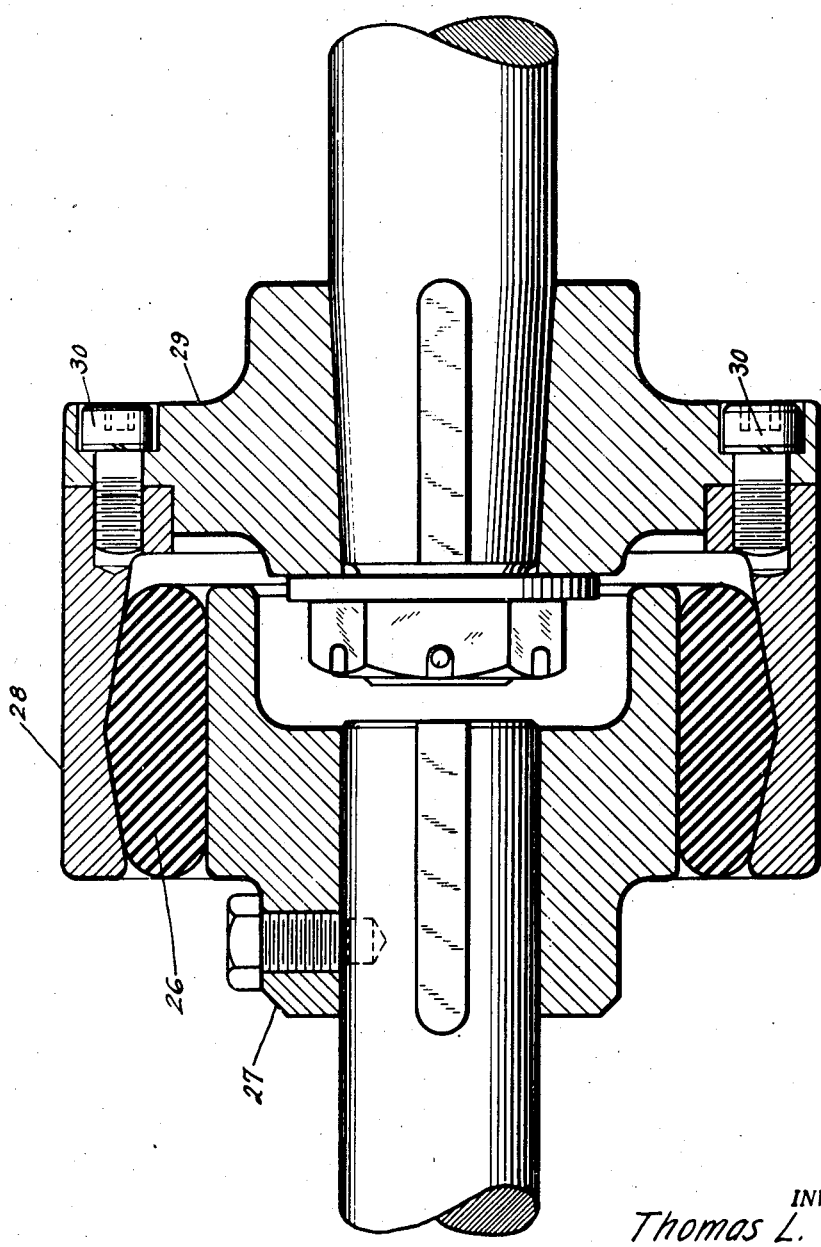

Patented Feb. 1, 1949

2,460,628

UNITED STATES PATENT OFFICE 2,460,628

FLEXIBLE COUPLING

Thomas L. Fawick, Akron, Ohio

Application February 15, 1943, Serial No. 475,872

2 Claims. (Cl. 64—11)

1

This invention relates to flexible shaft-couplings and procedure for making the same.

Its chief objects are to proved a coupling especially adapted for sustaining and cushioning axial thrust, as in the case of a coupling for a marine propeller shaft; to provide desirable cushioning of the torque; to provide an adequately flexible, and at the same time strong and durable, coupling; to provide economy of manufacture and facility of assembly and disassembly; and to provide for easy substitution of parts, as for repair or for changing the cushioning characteristics of the coupling.

Of the accompanying drawings:

Fig. 1 is an axial section of a coupling assembly embodying my invention in one of its preferred forms.

Fig. 2 is a fragmentary axial section illustrating preferred procedure for making the coupling.

Fig. 3 is an axial section of a coupling assembly embodying the invention in another one of its preferred forms.

Referring to the drawings, the assembly shown in Fig. 1 comprises a shaft 10 having secured thereon, as by a key 11, retaining plate 12 and bolts 13, 13, a coupling member 14 formed with a circumferential series of axially disposed holes for reception of respective sleeves or thimbles 15, 15. Each of the thimbles is formed at one end with a stop-flange 15ª and at its other end is threaded to receive a retaining nut 16.

A shaft 116, in series with the shaft 10, has secured thereon, as by a key 17, retaining plate 18 and bolts 19, 19, a hub member 20 on which is mounted, with an annular rabbet joint, and secured by bolts 21, 21, an annular coupling member 22 which is formed with a circumferential series of axially disposed holes for reception of respective studs 23, 23, which extend into the respective thimbles 15. Each of these studs is formed with a stop shoulder 23ª and is secured by a nut 24.

The inner surface of each of the thimbles 15 is of greater diameter in its middle portion than nearer its ends and held under radial compression against it is a rubber bushing 25 which surrounds the stud 23 and preferably is adhesively bonded to it as by vulcanization.

The rubber bushings being thus anchored to the studs, and being interlocked with the thimbles against relative movement in an axial direction, by reason of the double-taper internal form of the thimbles, the coupling is well adapted to sustain, and to cushion, heavy axial thrust such as that of a propeller shaft, and also to sustain,

2 and to cushion, heavy torque, while completely insulating all metal parts of one shaft assembly from those of the other shaft assembly and providing good flexible-coupling characteristics.

The bushings are especially adapted for sustaining heavy thrust and heavy torque because of being under radial compression and thus preloaded. Undesirable harmonic vibration can be avoided by substituting differently pre-loaded thimble-bushing-and-stud assemblies. This can readily be done by preliminarily removing the nuts 16 from the thimbles 15, removing the bolts 21, and then sliding to the right, along the hub member 20, the sub-assembly which comprises the annular member 22, the studs 23, the bushings 25 and the thimbles 15.

Before assembly with the thimble 15 the rubber bushing 25, vulcanized on the stud 23, preferably has the form shown in Fig. 2, with an annular recess in the middle of its outer face, to provide flow space for the rubber as it is forced in to the thimble, which operation gives it the form which is shown by dotted lines in Fig. 2 and full lines in Fig. 1.

In the embodiment shown in Fig. 3 a single annular rubber member 26 is similarly placed under radial compression between a hub member 27 and an annular outer member 28 which is detachably secured upon a hub member 29 by screws 30, 30. Preferably the rubber member 26 is adhered by vulcanization to the hub member 27 and axially interlocked with the outer metal member 28 as shown. The sub-assembly comprising the hub member 27, the rubber ring 26 and the metal ring 28 can be pre-assembled at the factory and readily associated with the other members at the place of use.

This embodiment also has the advantages of strong but cushioned sustension of torque and of axial thrust, in conjunction with good flexible-coupling characteristics, and ease of assembly and disassembly for substitution or repair.

Further modifications are possible with the scope of the appended claims.

I claim:

1. A flexible coupling for transmission shafts in series, said coupling comprising a first coupling member formed with a circumferentially spaced set of axially extending sockets, a set of torque-transmitting assemblies mounted in said sockets respectively, each of said assemblies comprising an annular, outer, shell member, an inner, axially disposed stud member, and an annular body of cushioning material having substantially the resilient deformability of vulcanized softrubber, said body being held under radial compression by said shell member and said stud member, releasable means for holding each shell member at a determinate position axially of its socket an annular coupling member constituting a mounting for the stud members and movable in an axial direction away from said first coupling member for simultaneously removing said assemblies from their apertures in said first coupling member, without affecting the radial compression of their said cushioning bodies, and a shaft-head member upon which said annular coupling member is mounted, the two being formed with mating stop faces limiting movement of the annular coupling member toward the said first coupling member when the latter is in determinate relation to the shaft-head member, so that the magnitude of axial preloading of the coupling as a thrust coupling is determined by mutual contacting of the said stop faces.

2. A flexible coupling as defined in claim 1 in which each cushioning body is surface-bonded to its stud member and mounted in its shell member in an axially elongated condition and is held under predetermined radial compression by the two solely by reason of its own axial recoil.

THOMAS L. FAWICK.

REFERENCES CITED

The following references are of record in the file of this patent:

UNITED STATES PATENTS

| Number | Name | Date |
| --- | --- | --- |
| 1,396,979 | Thomas | Nov. 15, 1921 |
| 1,732,657 | Picquerez | Oct. 22, 1929 |
| 1,760,492 | Hall | May 27, 1930 |
| 1,868,818 | Eksergian | July 26, 1932 |
| 1,940,884 | Rosenberg | Dec. 26, 1933 |
| 1,940,886 | Rosenberg | Dec. 26, 1933 |
| 1,941,061 | Thiry | Dec. 26, 1933 |
| 2,004,712 | Thiry | June 11, 1935 |
| 2,047,976 | Lord | July 21, 1936 |
| 2,049,024 | Robertson | July 28, 1936 |
| 2,251,804 | Reuter et al. | Aug. 5, 1941 |

FOREIGN PATENTS

| Number | Country | Date |
| --- | --- | --- |
| 296,776 | Great Britain | Oct. 10, 1929 |
| 474,581 | Great Britain | Nov. 3, 1937 |
| 480,241 | Germany | July 29, 1929 |
| 487,703 | Great Britain | June 24, 1938 |
| 493,794 | Great Britain | Oct. 14, 1938 |
| 654,728 | France | 1928 |
| 664,478 | Germany | 1938 |